United States Patent
Berkemeier (10) Patent No.: US 11,111,862 B2
(45) Date of Patent: Sep. 7, 2021

(54) METHODS AND SYSTEMS FOR AN ENGINE WITH PARTIAL DEACTIVATION

(71) Applicant: Ford Global Technologies, LLC, Dearborn, MI (US)

(72) Inventor: Oliver Berkemeier, Bergisch Gladbach (DE)

(73) Assignee: Ford Global Technologies, LLC, Dearborn, MI (US)

(*) Notice: Subject to any disclaimer, the term of this patent is extended or adjusted under 35 U.S.C. 154(b) by 184 days.

(21) Appl. No.: 16/224,636

(22) Filed: Dec. 18, 2018

(65) Prior Publication Data

US 2019/0211754 A1 Jul. 11, 2019

(30) Foreign Application Priority Data

Jan. 10, 2018 (DE) .......................... 102018200298.3

(51) Int. Cl.
| | |
|---|---|
| *B60T 7/12* | (2006.01) |
| *F02D 17/02* | (2006.01) |
| *F02D 41/00* | (2006.01) |
| *F02M 69/04* | (2006.01) |
| *F02M 26/05* | (2016.01) |
| *F02M 26/41* | (2016.01) |
| *F02M 26/42* | (2016.01) |
| *F02D 41/30* | (2006.01) |

(52) U.S. Cl.
CPC .......... *F02D 17/02* (2013.01); *F02D 17/026* (2013.01); *F02D 41/0065* (2013.01); *F02D 41/0082* (2013.01); *F02D 41/0087* (2013.01); *F02D 41/3094* (2013.01); *F02M 26/05* (2016.02); *F02M 26/41* (2016.02); *F02M 26/42* (2016.02); *F02M 69/042* (2013.01); *F02D 2200/10* (2013.01)

(58) Field of Classification Search
CPC .................................. F02D 41/30; F02D 41/26
USPC ......................................................... 701/103
See application file for complete search history.

(56) References Cited

U.S. PATENT DOCUMENTS

| | | | |
|---|---|---|---|
| 7,204,226 B2 | 4/2007 | Zillmer et al. | |
| 9,587,589 B2 | 3/2017 | Kemmerling et al. | |
| 2010/0326406 A1* | 12/2010 | Smiljanovski | F02F 1/243 |
| | | | 123/559.1 |
| 2013/0276747 A1* | 10/2013 | Springer | F02D 41/0087 |
| | | | 123/319 |
| 2013/0276749 A1* | 10/2013 | Springer | F02D 41/0087 |
| | | | 123/349 |
| 2013/0276755 A1* | 10/2013 | Springer | F02D 15/00 |
| | | | 123/435 |

(Continued)

FOREIGN PATENT DOCUMENTS

| | | | | |
|---|---|---|---|---|
| DE | 2337509 A1 * | 2/1975 | ............. | F02B 17/00 |
| DE | 2337509 A1 | 2/1975 | | |

(Continued)

*Primary Examiner* — Hung Q Nguyen
*Assistant Examiner* — Anthony Donald Taylor, Jr.
(74) *Attorney, Agent, or Firm* — Geoffrey Brumbaugh; McCoy Russell LLP (57) ABSTRACT

Methods and systems are provided for an engine configured to deactivate at least some cylinders. In one example, an engine system may comprise a first group of cylinders having a first compression ratio and a second group of cylinders having a second compression ratio greater than the first.

11 Claims, 4 Drawing Sheets

(56) References Cited

U.S. PATENT DOCUMENTS

| | | | | |
|---|---|---|---|---|
| 2013/0276759 A1* | 10/2013 | Springer | ................ | F02D 15/00 123/48 R |
| 2014/0278011 A1 | 9/2014 | Geckler et al. | | |
| 2015/0204279 A1* | 7/2015 | Kemmerling | ........... | F02B 37/04 123/568.11 |
| 2015/0285163 A1* | 10/2015 | Kemmerling | ......... | F02B 37/002 60/602 |

FOREIGN PATENT DOCUMENTS

| | | | | |
|---|---|---|---|---|
| DE | 3433619 A1 | 2/1986 | | |
| DE | 202014102194 | * 6/2014 | ............ | F02D 17/02 |
| DE | 202014102194 U1 | 6/2014 | | |
| JP | 4392689 B2 | 1/2010 | | |
| WO | 2015066674 A1 | 5/2015 | | |

\* cited by examiner

METHODS AND SYSTEMS FOR AN ENGINE WITH PARTIAL DEACTIVATION

CROSS REFERENCE TO RELATED APPLICATION

This application claims priority to German Patent Application No. 102018200298.3, filed Jan. 10, 2018. The entire contents of the above-referenced application are hereby incorporated by reference in their entirety for all purposes.

FIELD

The present description relates generally to an engine with partial deactivation and sets of cylinders with different compression ratios for increasing fuel efficiency at different engine loads.

BACKGROUND/SUMMARY

Internal combustion engines may be boosted by turbochargers or supercharger to increase engine performance, such as engine power output. Additionally, some internal combustion engines may include deactivatable cylinders to enable a portion of the engine cylinders to be deactivated when a power provided by all or some of the cylinders is not desired, such as during lower engine loads. Deactivation of the cylinders may include one or more of inhibiting air flow to the cylinder, fuel injection to the cylinders, and/or spark in the cylinder if the engine is a spark ignited engine.

Incorporation of turbochargers and cylinder deactivation into internal combustion engines may present some challenges. For example, during cylinder deactivation, exhaust gas production may be insufficient to allow the turbocharger to efficiently deliver boost to the active cylinders. Some previous examples include arranging a supercharger in the intake to supplement compressed gas flow when the exhaust gas flow is too low. However, superchargers increase manufacturing costs and increase packaging constraints.

In one example, the issues described above may be addressed by an engine system comprising at least two cylinders divided into a first cylinder group and a second cylinder group, wherein the first cylinder group comprises a first compression ratio and the second cylinder group comprises a second compression ratio greater than the first compression ratio and a first fuel injector of the first cylinder group positioned to port inject and a second fuel injector of the second cylinder group positioned to direct inject. In this way, the cylinder groups may be selectively operated during different engine loads, the different compression ratios of the cylinders increasing fuel economy.

As one example, adjacent cylinders of the cylinder groups may be fluidly coupled via flow transfer ducts. The ducts may direct exhaust gas from the first group of cylinders to the second group of cylinders during higher engine loads. By doing this, knock in the second group of cylinders may be mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
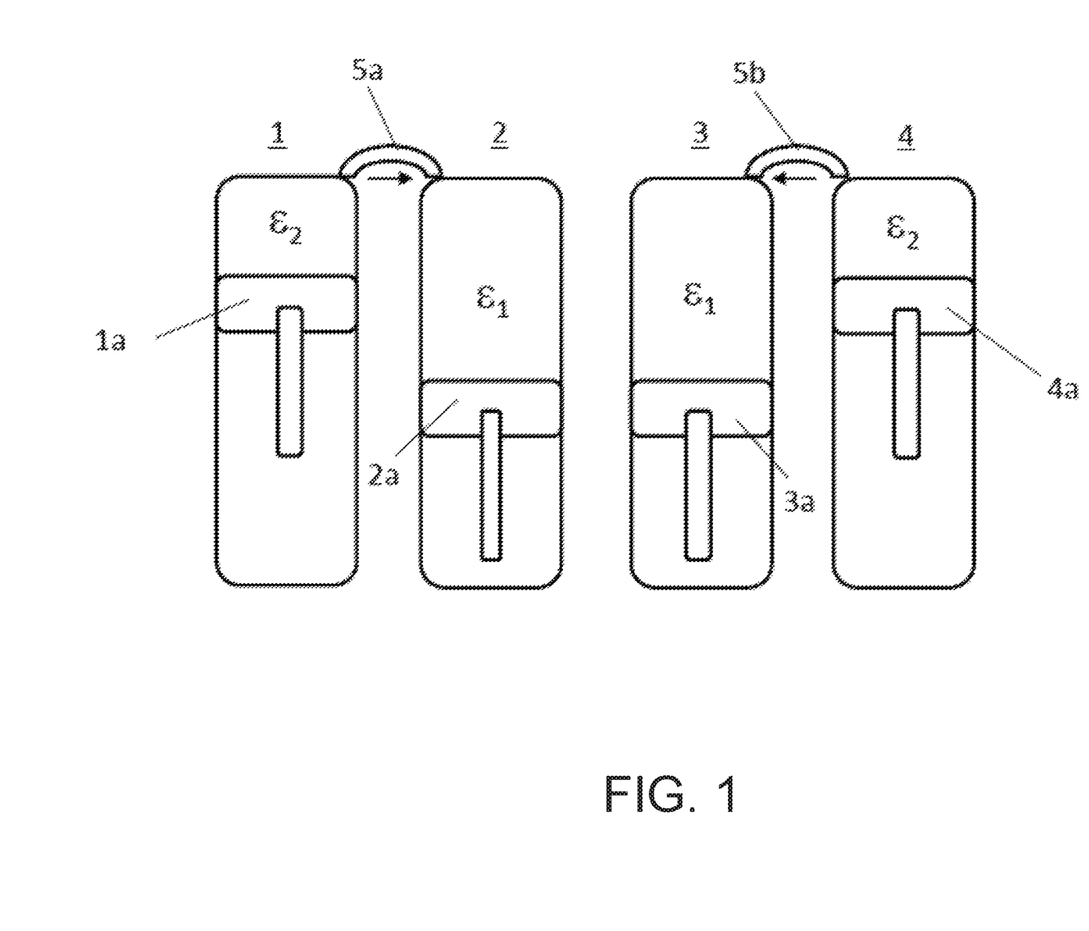
FIG. 1 schematically shows the cylinders of a first embodiment of the applied-ignition internal combustion engine.
Figure 2:
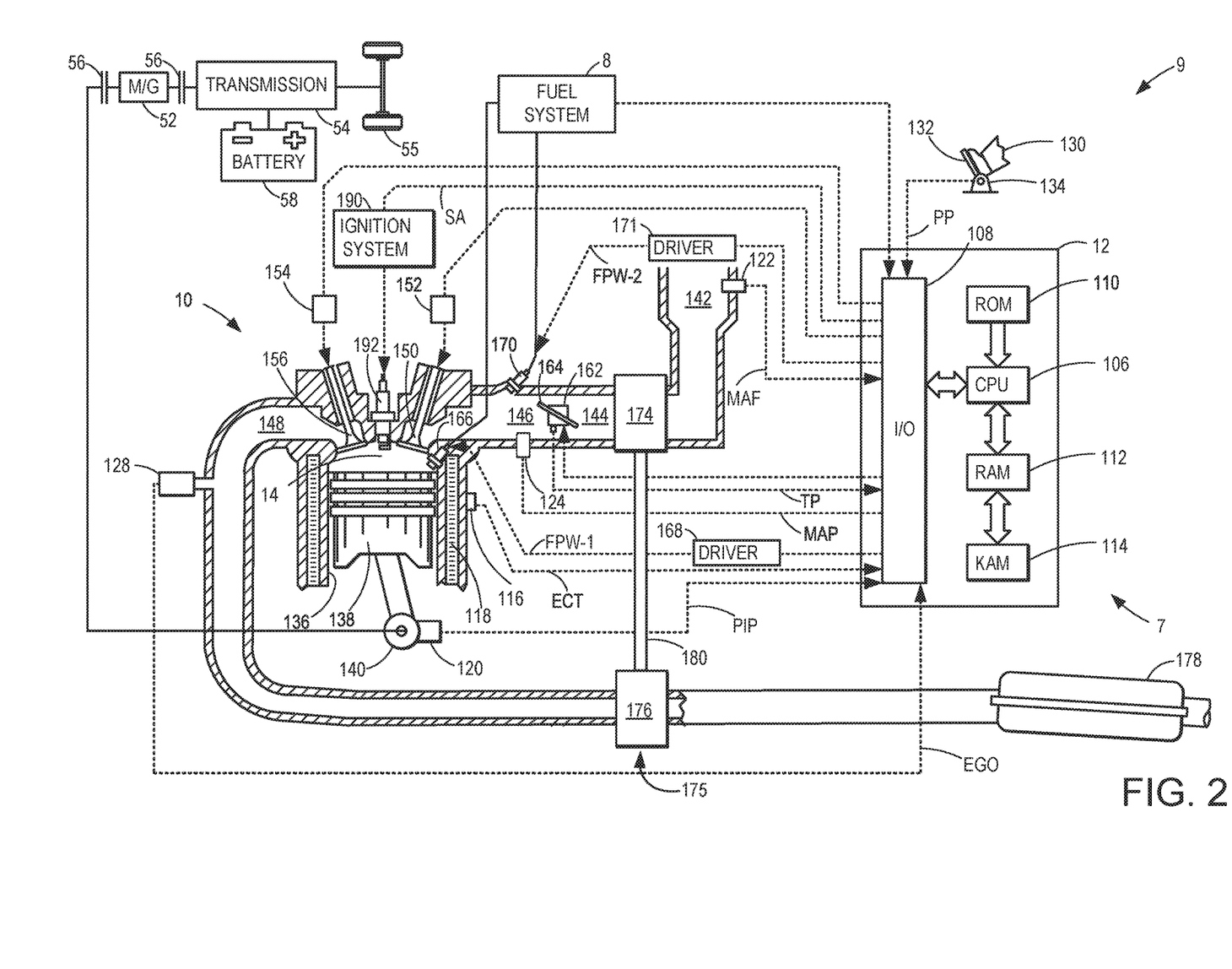
FIG. 2 illustrates a schematic of an engine included in a hybrid vehicle.
Figure 3:
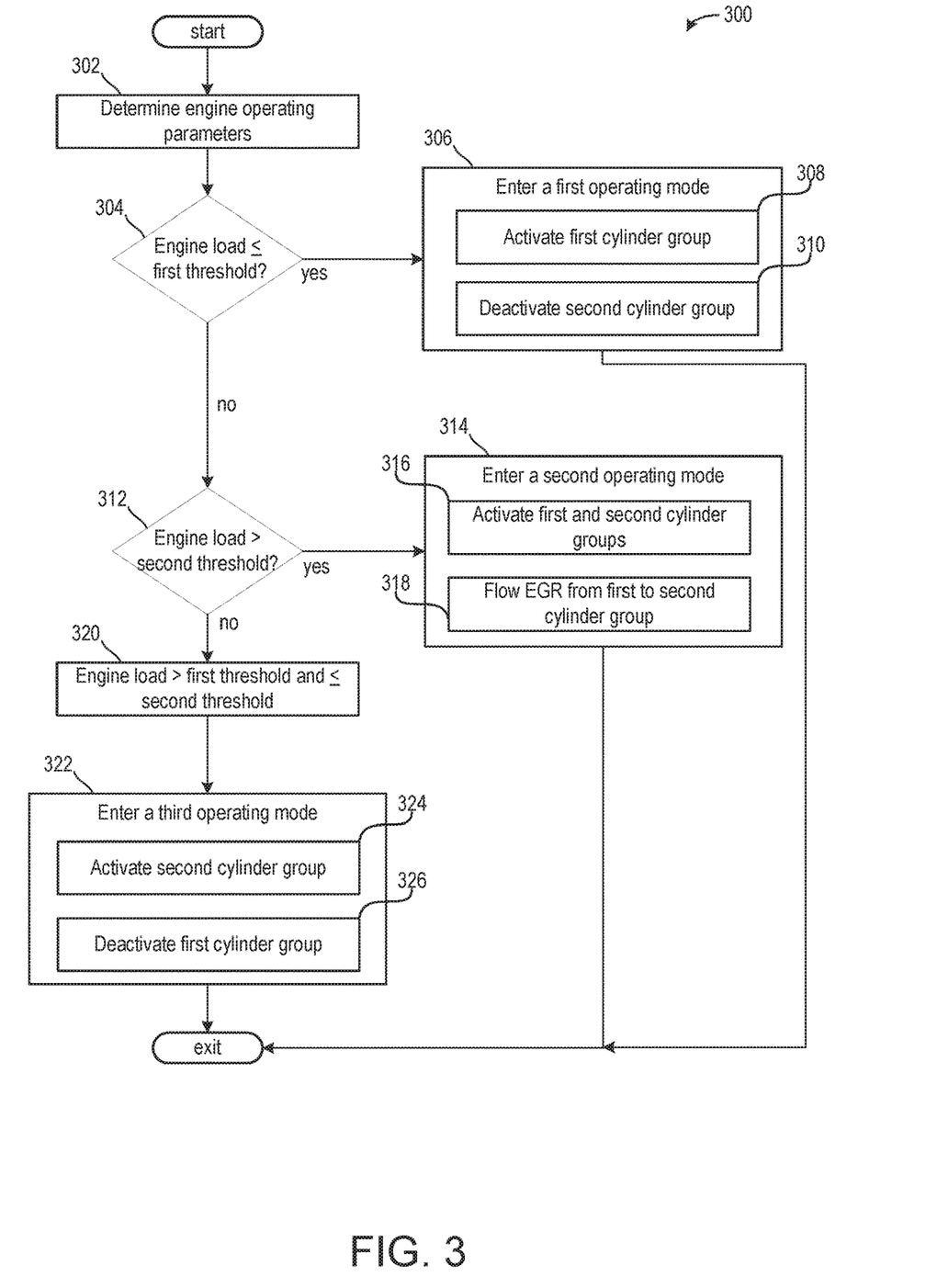
FIG. 3 shows a method for operating the engines of FIGS. 1 and 2.
Figure 4:
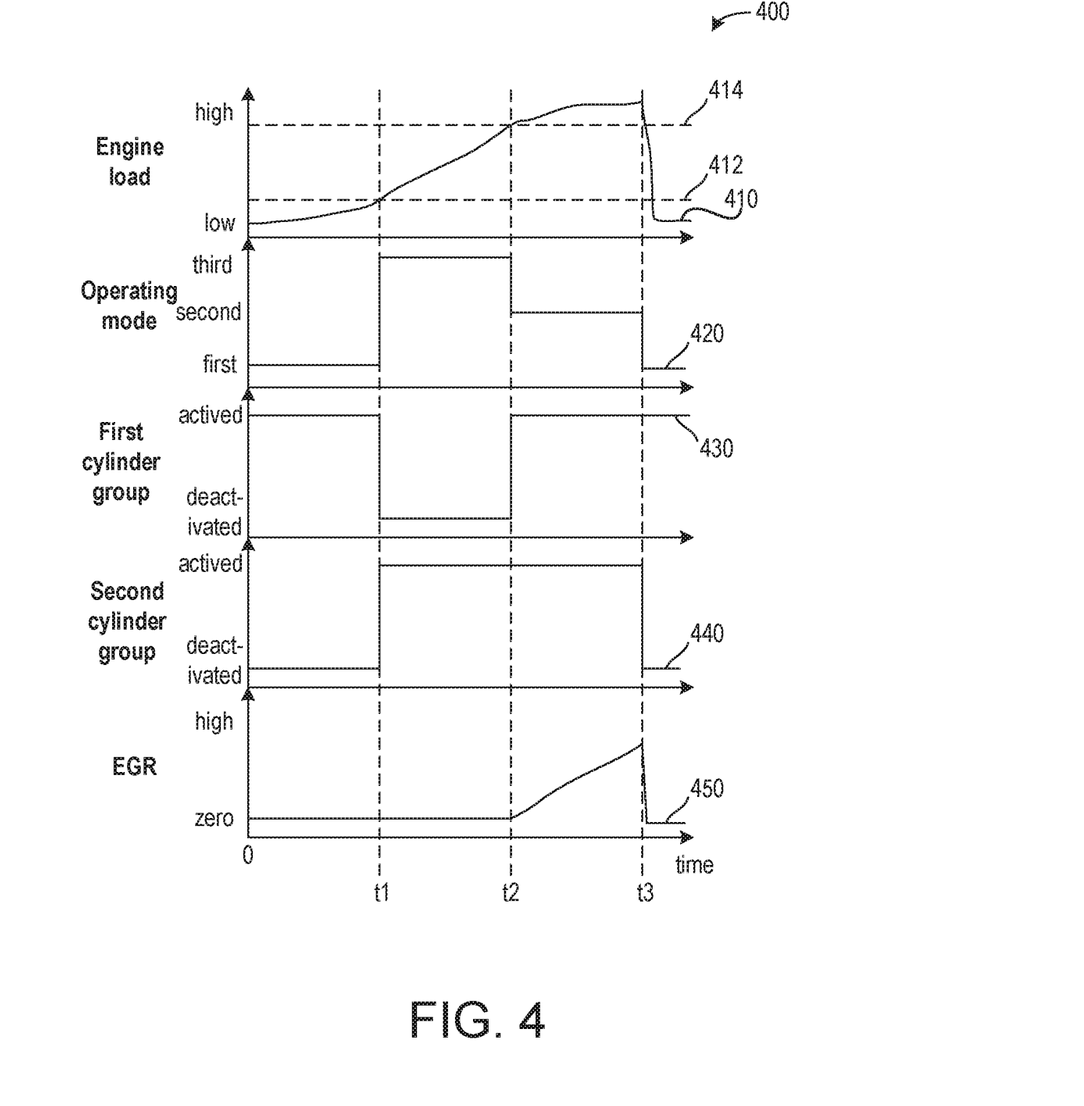
FIG. 4 shows an engine operating sequence illustrating various engine operating conditions as engine parameters change.

The following description relates to systems and methods for an engine with partial deactivation. FIG. 1 schematically shows the cylinders of a first embodiment of the applied-ignition internal combustion engine. FIG. 2 illustrates a schematic of an engine included in a hybrid vehicle. FIG. 3 shows a method for operating the engines of FIGS. 1 and 2. FIG. 4 shows an engine operating sequence illustrating various engine operating conditions as engine parameters change.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the development of internal combustion engines, it is a universal aim to minimize fuel consumption, wherein the emphasis in the efforts being made is on obtaining an improved overall efficiency.

Fuel consumption and thus efficiency pose a problem in particular in the case of Otto-cycle engines, that is to say in the case of an applied-ignition internal combustion engine. The reason for this lies in the fundamental operating process of the Otto-cycle engine.

The Otto-cycle engine operates, if direct injection is not provided, with a homogeneous fuel/air mixture which is prepared by external mixture formation by virtue of fuel being introduced into the inducted air in the intake system. Load control may be carried out via a throttle flap provided in the intake system. By adjusting the throttle flap, the pressure of the inducted air downstream of the throttle flap can be reduced to a greater or lesser extent. The further the throttle flap is closed, that is to say the more said throttle flap blocks the intake tract, the higher the pressure loss of the inducted air across the throttle flap, and the lower the pressure of the inducted air downstream of the throttle flap and upstream of the inlet into the at least two cylinders, that is to say combustion chambers. For a constant combustion chamber volume, it is possible in this way for the air mass, that is to say the quantity, to be set via the pressure of the inducted air. This may lead to fuel inefficiencies in the part-load and/or mid-load range for a port and/or intake injection, because low loads demand a high degree of throttling and a significant pressure reduction in the intake system, as a result of which the charge exchange losses increase with decreasing load and increasing throttling.

To reduce the described losses, various strategies for dethrottling an applied-ignition internal combustion engine have been developed.

One approach to a solution for dethrottling the Otto-cycle engine is for example an Otto-cycle engine operating process with direct injection. The injection of fuel directly into the combustion chamber of the cylinder is considered to be a suitable measure for dethrottling the Otto-cycle engine working process, by way of which fuel consumption can be noticeably reduced even in Otto-cycle engines. In certain operating ranges, quality regulation is then used.

With the direct injection of the fuel into the combustion chamber, it is possible in particular to realize a stratified combustion chamber charge, which can contribute significantly to the dethrottling of the Otto-cycle engine working process because the internal combustion engine can be leaned to a very great extent via the stratified charge operation, which offers thermodynamic advantages in particular in part-load operation, that is to say in the low and medium load range, when only small amounts of fuel are to be injected.

The stratified charge is distinguished by a highly inhomogeneous combustion chamber charge which cannot be characterized by a uniform air ratio but which has both lean ($\lambda>1$) mixture parts and also rich ($\lambda<1$) mixture parts, wherein an ignitable fuel-air mixture with a relatively high fuel concentration is present in the region of the ignition device.

Another option for optimizing the combustion process of an Otto-cycle engine consists in the use of an at least partially variable valve drive. By contrast to conventional valve drives, in which both the lift of the valves and the control timing are invariable, these parameters which have an influence on the combustion process, and thus on fuel consumption, can be varied to a greater or lesser extent via variable valve drives. Noticeable fuel savings can be obtained with only partially variable valve drives. If the closing time of the inlet valve and the inlet valve lift can be varied, this alone makes throttling-free and thus loss-free load control possible. The mixture mass which flows into the combustion chamber during the intake process is then controlled not via a throttle flap but rather via the inlet valve lift and the opening duration of the inlet valve. Variable valve drives are however expensive and may be undesired for series (e.g., mass) production.

A further approach to a solution for dethrottling an Otto-cycle engine is offered by cylinder deactivation, that is to say the deactivation of individual cylinders in certain load ranges. The efficiency of the Otto-cycle engine in part-load operation can be improved, that is to say increased, via a partial deactivation because the deactivation of one cylinder of a multi-cylinder internal combustion engine increases the load on the other cylinders, which remain in operation, if the engine power remains constant, such that the throttle flap can or may be opened further in order to introduce a greater air mass into said cylinders, whereby dethrottling of the internal combustion engine is attained overall. Furthermore, during the partial deactivation, that is to say at part load, the cylinders which are permanently in operation often operate in the region of higher loads, at which the specific fuel consumption is lower. The load collective is shifted toward higher loads.

The cylinders which remain operational during the partial deactivation furthermore exhibit improved mixture formation owing to the greater air mass supplied, and tolerate higher exhaust-gas recirculation rates.

Further advantages with regard to efficiency are attained in that a deactivated cylinder, owing to the absence of combustion, does not generate any wall heat losses owing to heat transfer from the combustion gases to the combustion chamber walls.

The multi-cylinder internal combustion engines with partial deactivation described in the prior art, and the associated methods for operating said internal combustion engines, nevertheless have considerable potential for improvement.

A further measure for improving the efficiency of an internal combustion engine and/or for reducing the fuel consumption consists in supercharging of the internal combustion engine, wherein supercharging is primarily a method of increasing power, in which the air used for the combustion process in the engine is compressed, whereby a greater mass of air can be supplied to each cylinder per working cycle. In this way, the fuel mass and therefore the mean pressure can be increased.

Supercharging is a suitable method for increasing the power of an internal combustion engine while maintaining an unchanged swept volume, or for reducing the swept volume while maintaining the same power. In all cases, supercharging leads to an increase in volumetric power output and a more expedient power-to-weight ratio. If the swept volume is reduced, it is thus possible to shift the load collective toward higher loads, at which the specific fuel consumption is lower. Supercharging in combination with a suitable transmission configuration, it is also possible to realize so-called downspeeding, with which it is likewise possible to achieve a lower specific fuel consumption.

Supercharging may consequently assist in the constant efforts in the development of internal combustion engines to minimize fuel consumption, that is to say to improve the efficiency of the internal combustion engine.

For supercharging, use may be made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy released by the exhaust-gas flow to the turbine and ultimately to the shaft is used for driving the compressor, which is likewise arranged on the shaft. The compressor conveys and compresses the charge air fed to it, as a result of which supercharging of the cylinders is obtained. A charge-air cooler may be advantageously provided in the intake system downstream of the compressor, via which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. Compression by cooling takes place.

The advantage of an exhaust-gas turbocharger in relation to a mechanical supercharger consists in that an exhaust-gas turbocharger utilizes the exhaust-gas energy of the hot exhaust gases, whereas a mechanical supercharger draws the energy used for driving it directly or indirectly from the internal combustion engine. In general, a mechanical or kinematic connection is desired for the transmission of power between the supercharger and the internal combustion engine.

The advantage of a mechanical supercharger, that is to say a supercharging blower, in relation to an exhaust-gas turbocharger consists in that the mechanical supercharger generates, and makes available, the desired charge pressure at all times, specifically regardless of the operating state of the internal combustion engine, in particular regardless of the present rotational speed of the crankshaft. This applies in particular to a mechanical supercharger which can be driven by way of an electric machine.

In the previous examples, it is specifically the case that difficulties are encountered in achieving an increase in power in all engine speed ranges via exhaust-gas turbocharging. A relatively severe torque drop is observed in the event of a certain engine speed being undershot. Said torque drop is understandable if one takes into consideration that the charge pressure ratio is dependent on the turbine pressure ratio. If the engine speed is reduced, this leads to a smaller exhaust-gas mass flow and therefore to a lower turbine pressure ratio. Consequently, toward lower engine speeds, the charge pressure ratio likewise decreases. This equates to a torque drop.

In the context of applied-ignition internal combustion engines, it may also be taken into consideration that the efficiency $\eta$ of the Otto-cycle engine at least approximately correlates with the compression ratio E. That is to say, the efficiency $\eta$ increases with the compression ratio E, is generally higher in the presence of a relatively high compression ratio, and is generally lower in the presence of a relatively low compression ratio.

Consequently, with regard to efficiency, the cylinders of an internal combustion engine would preferably have to be configured with as high a compression ratio as possible. The compression ratio however cannot be increased to an arbitrary extent because, with increasing compression ratio, the knocking tendency, that is to say the tendency for auto-ignition of mixture components, also increases. Modern Otto-cycle engines therefore generally have a compression ratio of at most 8 to 12, with a compression ratio of approximately 15 promising the best efficiency. In this way, although efficiency is limited, the desired resistance to knocking, in particular at high loads, is also ensured.

According to the previous examples, the knocking tendency is also counteracted by virtue of the ignition being retarded as desired, for example in the presence of relatively high loads, whereby the combustion center of gravity is retarded and the combustion pressure and combustion temperature decrease. This however may have an adverse effect on the efficiency.

Toward relatively high loads, at which the operation of the internal combustion engine may be increasingly limited due to knock, the knocking tendency can also be counteracted by retarding the closing of the inlet of a cylinder. The effective compression ratio $\varepsilon_{\mathit{eff}}$ can be lowered by lengthening the inlet-side opening duration or through retarded closing of at least one inlet valve, wherein, with an inlet still open, a part of the cylinder fresh charge or of the combustion air is displaced into the intake system again during the compression stroke. A high geometric compression ratio $\varepsilon_{geo}$, which is basically to be regarded as advantageous and which, at relatively low loads, is highly conducive to improving efficiency, can in this way be virtually reduced, or replaced by a lower effective compression ratio $\varepsilon_{\mathit{eff}}$, and thus mitigated, at relatively high loads.

Knocking may also be counteracted in that, using an exhaust-gas recirculation arrangement (EGR), with increasing load, an increasing amount of exhaust gas is likewise recirculated if appropriate.

As a result of the admixing of exhaust gases to the cylinder fresh charge for the increase of the exhaust-gas fraction in the cylinder fresh charge, the ignition delay can be increased, and the rate of combustion reduced. In this way, it is possible to realize low combustion temperatures, specifically both via external exhaust-gas recirculation, that is to say recirculation of combustion gases from the exhaust gas side to the intake side of the internal combustion engine, and via an internal exhaust-gas recirculation, that is to say retention of exhaust gases in the cylinder during the charge exchange. With increasing exhaust-gas recirculation rate, the nitrogen oxide emissions of an internal combustion engine can also be considerably reduced.

In one embodiment, an applied-ignition internal combustion engine having at least two cylinders, in which each cylinder has at least one outlet opening which is adjoined by an exhaust line for discharging the exhaust gases via an exhaust-gas discharge system, each cylinder has at least one inlet opening which is adjoined by an intake line for the supply of charge air via an intake system, at least two cylinders are configured so as to form at least two groups with in each case at least one cylinder, the at least one cylinder of each group being formed as a cylinder which can be activated in a load-dependent manner and which is deactivated if a predefinable load is undershot, and the at least two groups are distinguished by different compression ratios $\varepsilon_i$, the at least one cylinder of a first group having a compression ratio $\varepsilon_1$, and the at least one cylinder of a second group having a compression ratio $\varepsilon_2$, where $\varepsilon_2 < \varepsilon_1$, and which internal combustion engine is distinguished by the fact that the at least one cylinder of the first group is equipped with a direct injection configuration for the direct introduction of fuel into a cylinder-specific combustion chamber, and the at least one cylinder of the second group is equipped with an intake pipe injection configuration for the introduction of fuel into a cylinder-specific intake system.

The internal combustion engine according to the present disclosure has a cylinder deactivation or partial deactivation configuration, in the case of which the cylinders can be deactivated in a manner dependent on the present load, such that the load demand on the at least one remaining cylinder increases, and an opening of the throttle flap is desired in order to introduce a greater air mass into said cylinder.

The cylinders of the internal combustion engine according to the present disclosure are grouped, wherein all of the cylinders of the at least two groups are cylinders which can be activated in a load-dependent manner and which are or can be deactivated in the event of undershooting of a predefinable load.

Consequently, all of the cylinders may be presently operational cylinders, that is to say fired, or else only the cylinders of one group are operational and are fired. This yields numerous different operating modes for the internal combustion engine.

In a first operating mode, only the second cylinder group is activated and fired, while the at least one cylinder of the first group is deactivated and is not fired. When the internal combustion engine is transferred into the second operating mode, the at least one cylinder of the second group is deactivated, and the at least one cylinder of the first group is activated. The third operating mode is distinguished by the fact that both cylinder groups are activated and fired.

The partial deactivation, which contributes significantly to the dethrottling of the internal combustion engine, is supplemented according to the disclosure by a structural feature, specifically by the fact that the cylinder groups have different compression ratios $\varepsilon_i$.

In the present case, the cylinders of the first group have a higher compression ratio $\varepsilon_1$, such that said cylinders have a fundamentally higher efficiency $\eta$, in particular a higher efficiency than if said cylinders had the lower compression ratio $\varepsilon_2$ of the cylinders of the second group. It may be taken into consideration here that the efficiency $\eta$ correlates more or less with the compression ratio $\varepsilon_i$, that is to say the efficiency $\eta$ is generally higher in the case of a relatively high compression ratio $\varepsilon_i$ and is generally lower in the case of a relatively low compression ratio $\varepsilon_i$. This basic relationship can however break down toward very high compression ratios, because then inter alia the blow-by increases intensely, which has an adverse effect on efficiency.

The different compression ratios $\varepsilon_i$ are the result of the configuration of the cylinder groups for different operating or load ranges. Whereas the cylinders of the second group are configured for part-load operation at low loads or low rotational speed of the internal combustion engine, the cylinders of the first group are configured for part-load operation at medium loads or medium rotational speeds.

At low loads or low rotational speeds, the internal combustion engine is then operated in accordance with the first operating mode, in which only the second cylinder group is fired.

With increasing load, the internal combustion engine is then transferred into the second operating mode, that is to say the second cylinder group is deactivated and the first cylinder group is activated, such that, at medium loads or medium rotational speeds, only the at least one cylinder of the first group is activated and fired.

With further increasing load, the internal combustion engine is transferred into the third operating mode. Then, both cylinder groups are fired in order, in the presence of relatively high, high and very high loads, to be able to satisfy the present load demand. Here, to counteract knocking of the first cylinder group, it is necessary in some cases to implement suitable measures, for example an increase of the exhaust-gas fraction in the cylinder fresh charge of the first cylinder group.

The cylinder groups have not only different compression ratios $\varepsilon_i$ but also different fuel injection concepts. Whereas the at least one cylinder of the first group is equipped with a direct injection configuration, the at least one cylinder of the second group has an intake pipe injection configuration.

Thus, the fuel injection concept advantageously corresponds to the respective compression ratio.

Since only a small amount of time is available for the preparation of an ignitable and combustible fuel-air mixture as a result of the direct injection of the fuel into the combustion chamber, direct-injection internal combustion engines are more sensitive with regard to the mixture formation than internal combustion engines with intake pipe injection, for which reason an intake pipe injection configuration offers advantages in the case of relatively small fuel quantities, also with regard to fuel consumption.

Furthermore, a concept with intake pipe injection burns the fuel-air mixture with significantly fewer particles. That is to say, the untreated emissions of particles or soot are considerably lower. In this respect, it would be possible for a particle filter provided in the exhaust-gas discharge system to possibly be bypassed if, at low loads or rotational speeds, in accordance with the first operating mode, only the second cylinder group of the internal combustion engine is fired. Thus, the loading on the particle filter would be lower, and the exhaust-gas back pressure would be lowered, specifically both when the filter is bypassed and when flow passes through the filter. The lower exhaust-gas back pressure is advantageous with regard to the charge exchange and contributes further to lowering the fuel consumption and increasing efficiency.

For the stated reasons, embodiments may also be advantageous in which the at least one cylinder of the first group is additionally equipped with an intake pipe injection configuration.

From that stated above, it emerges that the internal combustion engine according to the disclosure has an increased efficiency $\eta$ not only at low loads or low rotational speeds but rather also in the range of medium loads or medium rotational speeds, in particular also because the cylinders of the first group which are operational at medium loads, with their relatively high compression ratio $\varepsilon_1$, contribute to an increased overall efficiency of the internal combustion engine. The increased knocking tendency of the first cylinder group owing to the relatively high compression ratio $\varepsilon_1$ proves to be a problem at medium loads. If necessary, the increased knocking tendency may however be allowed for at relatively high loads through suitable measures.

The cylinder groups may also differ from one another with regard to other operating parameters or design features, for example the cooling arrangement, the combustion process, the inlet ducts, the outlet ducts, the injection nozzles and/or the ignition devices.

With the internal combustion engine according to the present disclosure, an applied-ignition internal combustion engine is provided which is further improved with regard to efficiency. The first object on which the disclosure is based is thus achieved.

The internal combustion engine according to the present disclosure has at least two cylinders or at least two groups with in each case at least one cylinder. In this respect, internal combustion engines with three cylinders which are configured in three groups with in each case one cylinder, or internal combustion engines with six cylinders which are configured in three groups with in each case two cylinders, are likewise internal combustion engines according to the disclosure. The three cylinder groups may have different compression ratios $\varepsilon_i$ and be activated and deactivated successively within the context of a partial deactivation. The partial deactivation is thereby further optimized. The cylinder groups may also comprise a different number of cylinders.

Embodiments of the applied-ignition internal combustion engine may comprise where the at least two cylinders form two groups with in each case at least one cylinder. Two cylinder groups have the advantage over embodiments with several cylinder groups that the control or regulation of the partial deactivation is less complex. It may furthermore be taken into consideration that the realization of mass and moment compensation, which can preferably likewise be activated in parts, is made more difficult by the different compression ratios $\varepsilon_i$, and the outlay for this increases considerably with the increase in the number of cylinder groups.

Embodiments of the applied-ignition internal combustion engine may comprise where the at least one cylinder of the second group has a compression ratio $\varepsilon_1$ and the at least one cylinder of the first group has a compression ratio $\varepsilon_2$, where $\varepsilon_2+1.5<\varepsilon_1$ or where $\varepsilon_2+2<\varepsilon_1$.

Embodiments of the applied-ignition internal combustion engine may comprise where the at least one cylinder of the second group has a compression ratio $\varepsilon_1$ and the at least one cylinder of the first group has a compression ratio $\varepsilon_2$, where $\varepsilon_2+2.5<\varepsilon_1$.

Embodiments of the applied-ignition internal combustion may comprise where the at least one cylinder of the second group has a compression ratio $\varepsilon_1$ and the at least one cylinder of the first group has a compression ratio $\varepsilon_2$, where $\varepsilon_2+3<\varepsilon_1$ or where $\varepsilon_2+3.5<\varepsilon_1$.

Whereas the embodiments above are concerned with the relative difference between the two cylinder groups in terms of compression ratio, the following embodiments relate to the absolute compression ratio of the two groups.

Embodiments of the applied-ignition internal combustion engine may comprise where the at least one cylinder of the first group has a compression ratio $\varepsilon_2$, where $8<\varepsilon_2<12$.

Embodiments of the applied-ignition internal combustion engine may comprise where the at least one cylinder of the first group has a compression ratio $\varepsilon_2$, where $9<\varepsilon_2<11$.

Embodiments of the applied-ignition internal combustion engine may comprise where the at least one cylinder of the first group has a compression ratio $\varepsilon_2$, where $9.5<\varepsilon_2<10.5$.

Embodiments of the applied-ignition internal combustion engine may comprise where the at least one cylinder of the second group has a compression ratio $\varepsilon_1$, where $11.5<\varepsilon_1<14.5$.

Embodiments of the applied-ignition internal combustion engine may comprise where the at least one cylinder of the second group has a compression ratio $\varepsilon_1$, where $12.5<\varepsilon_1<14.5$.

Embodiments of the applied-ignition internal combustion engine may comprise where the at least one cylinder of the second group has a compression ratio $\varepsilon_1$, where $13<\varepsilon_1<14.5$.

Embodiments of the applied-ignition internal combustion engine may comprise where at least one flow transfer duct is provided, via which exhaust gas of an operational cylinder of the first group can be supplied to an operational cylinder of the second group.

In the present case, the exhaust gas of an operational cylinder of the first group can be supplied via the flow transfer channel to an operational cylinder of the second group. The supplied exhaust gas can serve to reduce the knocking tendency of the second cylinder group at relatively high loads.

In this context, embodiments of the applied-ignition internal combustion engine may comprise where exhaust gas of an operational cylinder of the first group, as exhaust gas-emitting cylinder, can, during the charge exchange, via the flow transfer duct, be extracted and supplied to an operational cylinder of the second group, as exhaust gas-receiving cylinder.

The cylinder that emits exhaust gas is also referred to as exhaust gas-emitting cylinder, whereas the cylinder that receives the exhaust gas is also referred to as exhaust gas-receiving cylinder. Each operational cylinder of the first group can serve as an exhaust gas-emitting cylinder, and supply exhaust gas to each or one cylinder of the second group.

It may be desired for exhaust gas to be supplied to a cylinder of the second group during the charge exchange. Here, it may be taken into consideration that, when the flow transfer duct is opened up, the exhaust gases from the operational cylinder of the first cylinder group flow at high speed through the flow transfer duct into the exhaust gas-receiving cylinder owing to the high pressure level, and the associated high pressure difference between the operational exhaust gas-emitting cylinder and the flow transfer channel or the exhaust gas-receiving cylinder, prevailing toward the end of the combustion in the cylinder. This pressure-driven transfer process assists the supply of exhaust gas.

It may be desired for the flow transfer duct to be shaped to have the smallest possible volume or to be as short as possible to decrease packaging constraints. In the case of a four-cylinder in-line engine, it may be desired for an outer cylinder to supply exhaust gas to a directly adjacent inner cylinder.

The transfer of the exhaust gas by the flow transfer duct is advantageously assisted in that the exhaust gas-receiving cylinder of the second group is a following cylinder in an ignition sequence, and the exhaust gas-emitting cylinder of the first group is a preceding cylinder in the ignition sequence.

Such an offset of the working processes offers advantages for the transfer of exhaust gas from one cylinder into the other cylinder. In the case of a four-cylinder in-line engine whose cylinders are operated with the ignition sequence 1-2-4-3, it is for example the case that the fourth cylinder is expedient for supplying exhaust gas to the third cylinder, which follows said fourth cylinder in the ignition sequence. While the fourth cylinder, during the course of an exhaust stroke, assists the transfer of the exhaust gas by way of an upwardly directed stroke movement of the piston, the third cylinder simultaneously draws in the exhaust gas by way of a downwardly directed stroke movement of the piston during the course of an intake stroke.

Owing to the stroke movement of the piston during the exhaust stroke, the exhaust gas-emitting cylinder pumps the transferred exhaust gas, in the manner of a piston-type working machine into the exhaust gas-receiving cylinder.

Embodiments of the applied-ignition internal combustion engine may comprise where the at least one flow transfer duct is at least jointly formed by the intake system.

Applied-ignition internal combustion engines having four cylinders in an in-line arrangement, in which the two inner cylinders and the two outer cylinders form in each case different groups may be an embodiment of the present disclosure.

Embodiments of the applied-ignition internal combustion engine may comprise where each cylinder is equipped with an ignition plug for initiating the applied ignition. The ignition plug is an ignition device for the reliable initiation of an ignition spark, which also has the desired durability and is also inexpensive. It is nevertheless also possible for other ignition devices to be used for initiating the applied ignition.

Embodiments of the applied-ignition internal combustion engine may comprise where a regulated throttle flap is provided for load control. An advantage of the adjustable throttle flap is that, upon the activation or deactivation of the partial deactivation, that is to say of a cylinder, the torque of the engine does not fall or rise, and the driver does not need to adjust the accelerator pedal in order to maintain the load, as would be the case with a non-adjustable throttle flap.

It is preferable for the adjustable throttle flap to be an electronically regulated throttle flap, and for an engine controller to perform the regulation of said throttle flap. Said embodiment is also preferable with regard to costs. Here, embodiments may comprise where the throttle flap can be regulated in a closed-loop process.

In some embodiments, a method for operating an applied-ignition internal combustion engine of a type described above, is achieved via a method which is characterized in that, in a first operating mode, only the at least one cylinder of the first group is activated and fired, wherein the at least one cylinder of the second group is deactivated and not fired.

Method variants may comprise where, proceeding from the first operating mode, with increasing load and in the event of overshooting of a first predefinable load $T_{up,1}$, the at least one cylinder of the first group is deactivated and the at least one cylinder of the second group is activated, whereby the internal combustion engine is transferred into a third operating mode.

In this context, method variants may comprise where, with further increasing load and in the event of overshooting of a second predefinable load $T_{up,2}$, where $T_{up,2} > T_{up,1}$, the at least one cylinder of the first group is activated again, whereby the internal combustion engine is transferred into a second operating mode.

In this context, method variants may comprise where, in the third operating mode, exhaust gas of an operational cylinder of the first group is, during the charge exchange, supplied to an operational cylinder of the second group in order to reduce the knocking tendency of the first cylinder group.

Here, method variants are likewise advantageous in which, proceeding from the second operating mode, with decreasing load and in the event of undershooting of a third predefinable load $T_{down,2}$, the at least one cylinder of the first group is deactivated, whereby the internal combustion engine is transferred into the third operating mode.

In this context, method variants may comprise where, proceeding from the third operating mode, with further decreasing load and in the event of undershooting of a fourth predefinable load $T_{down,1}$, the at least one cylinder of the first group is activated again and the at least one cylinder of the second group is deactivated, whereby the internal combustion engine is transferred into the first operating mode.

Method variants may comprise where the predefinable load $T_{up,1}$ and/or $T_{up,2}$ and/or $T_{down,1}$ and/or $T_{down,2}$ is dependent on the rotational speed n of the internal combustion engine.

Then, there is not only one specific load, upon the undershooting or overshooting of which a cylinder deactivation takes place regardless of the rotational speed n. Instead, a rotational-speed-dependent approach is followed, and a part-load range in the characteristic map is defined in which partial deactivation or switching is performed.

It is basically possible for further operating parameters of the internal combustion engine, for example the engine temperature or the coolant temperature after a cold start of the internal combustion engine, to be used as a criterion for a cylinder deactivation.

Method variants may comprise where the fuel supply of a deactivated cylinder and/or the applied ignition of a deactivated cylinder is deactivated.

It may be possible for the fuel supply of a deactivated cylinder to be maintained and for the deactivation of a cylinder to be performed exclusively through deactivation of the applied ignition. This would however be highly disadvantageous with regard to fuel consumption and pollutant emissions and would oppose the aim pursued by the partial deactivation, specifically that of reducing fuel consumption and improving efficiency.

Here, the intake charge air can flow through the deactivated cylinder as before, wherein owing to the fact that no fuel is introduced, no combustible or ignitable fuel/air mixture is provided and consequently—even in the case of the ignition spark being initiated—no ignition, and no combustion, takes place in said cylinder.

During the partial deactivation, the deactivated cylinder basically does not contribute to the power output of the internal combustion engine. If the charge air supply is not shut off but rather is maintained, the air supplied to the deactivated cylinder continues to participate in the four working strokes—intake, compression, expansion and exhaust—such that not only does the deactivated cylinder not output any power, but also, much more work may be performed for the charge exchange in said cylinder, which reduces efficiency, that is to say is thermodynamically disadvantageous. Therefore, method variants may be advantageous in which the air supply to a deactivated cylinder is stopped.

The limit loads $T_{down,1}$ and $T_{up,1}$ and also $T_{down,2}$ and $T_{up,2}$ predefined for the undershooting and overshooting respectively may be of equal magnitude, though may also differ in magnitude.

FIG. 1 schematically shows the four cylinders 1, 2, 3, 4 of a four-cylinder in-line applied-ignition engine 10.

The four cylinders 1, 2, 3, 4 which are in an in-line configuration form two cylinder groups with in each case two cylinders 1, 2, 3, 4, wherein the second group comprises the inner cylinders 2, 3 and the first group comprises the outer cylinders 1, 4. Each cylinder 1, 2, 3, 4 has a piston 1a, 2a, 3a, 4a, respectively, and is shaped as a cylinder 1, 2, 3, 4 which can be activated in a load-dependent manner and which is in a deactivated state, or is deactivated, in the event of undershooting of a predefinable load $T_{down,1}$ or $T_{down,2}$.

The two cylinder groups may be characterized by different compression ratios, wherein the cylinders 2, 3 of the second group have a compression ratio ε1 and the cylinders 1, 4 of the first group have a compression ratio ε2, where ε2≪ε1.

The two cylinder groups may additionally comprise different injection configurations. The cylinders 2, 3 of the second group may be equipped with a direct injection configuration for the direct introduction of fuel into a cylinder-specific combustion chamber, whereas the cylinders 1, 4 of the first group may be equipped with an intake pipe injection and/or port injection configuration for the introduction of fuel into the cylinder-specific intake system (not illustrated).

In a first operating mode, in part-load operation at low loads or low rotational speeds, only the cylinders 1, 4 of the first group are fired, whereas the cylinders 2, 3 of the second group are deactivated and are not fired. With increasing load and in the event of overshooting of a predefined load Tup,1, the cylinders 1, 4 of the first group are deactivated and the cylinders 2, 3 of the second group are activated, whereby the internal combustion engine is transferred into a third operating mode. With further increasing load and in the event of overshooting of a predefined load Tup,2>Tup,1, the cylinders 1, 4 of the first group are activated again. The internal combustion engine is then operated in a second operating mode, which is distinguished by the fact that all four cylinders 1, 2, 3, 4 are activated and fired.

In order, in the second operating mode, at high and very high loads, to prevent knocking of the inner cylinders 2, 3 of the second group and allow for the high compression ratio ε1 of the second cylinder group, it may be or become expedient and desired to increase the exhaust-gas fraction in the cylinder fresh charge of the second cylinder group, in order to increase the ignition delay and reduce the rate of combustion, whereby the combustion temperatures and the knocking tendency are reduced.

For this purpose, two flow transfer ducts 5a, 5b are provided, where exhaust gas of an operational cylinder 1, 4 of the first group can be supplied to an operational cylinder 2, 3 of the second group.

In the present case, in each case one outer cylinder 1, 4 of the first group and the adjacent inner cylinder 2, 3 of the second group form a cylinder pair, wherein, during the charge exchange, the outer cylinder 1, 4 of the first group, as exhaust gas-emitting cylinder 1, 4, supplies exhaust gas via the flow transfer duct 5a, 5b to the adjacent inner cylinder 2, 3 of the second group, as exhaust gas-receiving cylinder 2, 3.

In one embodiment, the engine 10 of FIG. 1 comprises four cylinders, including a first cylinder 1, a second cylinder 2, a third cylinder 3, and a fourth cylinder 4. The cylinders may be arranged in an in-line arrangement as shown. However, it will be appreciated that the cylinders may be arranged in a V, box, W, or other configuration without departing from the scope of the present disclosure.

The first cylinder 1 and the fourth cylinder 4 may be outer cylinders, sandwiching the second cylinder 2 and the third cylinder 3. The cylinders may be divided in separate operational groups, wherein each cylinder of a group may be activated together independent of cylinders in a different group. In the example of FIG. 1, the cylinders are divided into two groups, a first cylinder group comprising the first cylinder 1 and the fourth cylinder 4 and a second cylinder group comprising the second cylinder 2 and the third cylinder 3.

The first cylinder group may be differentiated from the second cylinder group by at least a compression ratio of the first and fourth cylinders 1, 4 compared to the second and third cylinders 2, 3. For example, compression ratios of the first and fourth cylinders 1, 4 may be less than the compression ratios of the second and third cylinders 2, 3. In one example, the compression ratio of the first cylinder 1 is substantially equal to the compression ratio of the fourth cylinder 4, wherein the compression ratio of the first and fourth cylinders 1, 4 is 10:1. Similarly, the compression ratio of the second cylinder 2 may be substantially equal to the compression ratio of the third cylinder 3, wherein the compression ratio of the second and third cylinders 2, 3 is 14:1. It will be appreciated that the compression ratios of the cylinders of the first and second cylinder groups may be adjusted without departing from the scope of the present disclosure. For example, the first cylinder group may comprise a compression ratio of 8:1 and the second cylinder group may comprise a compression ratio of 16:1.

Due to the lower compression ratio, the first cylinder group may be opportunistically operated at lower engine loads. This may increase fuel efficiency. Furthermore, the second cylinder group may be deactivated during lower engine loads. As an engine load increases, to a mid-load, the second cylinder group may be activated and the first cylinder group deactivated. As the engine load continues to increase, for example to a high engine load, each of the first and second cylinder groups may be activated to meet a desired engine power output.

The first and second cylinder groups may be further differentiated via a fuel injection configuration. In one example, the first cylinder group may comprise a port and/or intake injection configuration. Alternatively, the second cylinder group may comprise a direct injection configuration.

Furthermore, cylinders of the first and second cylinder groups may be fluidly coupled to one another via first and second flow transfer ducts 5a, 5b. More specifically, the first flow transfer duct 5a may fluidly couple the first cylinder 1 to the second cylinder 2 during some operating conditions. The second flow transfer duct 5b may fluidly couple the fourth cylinder 4 to the third cylinder 3 during some operating conditions. In one example, the first and fourth cylinders 1, 4 are fluidly coupled to the second and third cylinders 2, 3, respectively, during higher engine loads. In one example, the first and second flow transfer ducts 5a, 5b may be shaped to flow EGR from the first cylinder group to the second cylinder group, which may mitigate knock.

In some examples, additionally or alternatively, the first and second flow transfer ducts 5a, 5b may be used to flow compressed gases (e.g., air and/or exhaust gas) from the first cylinder group to the second cylinder group. If the compressed gas is air, then the first cylinder group may be unfueled. For example, as described above, during some operations of the engine where at least some of the cylinders are deactivated, airflow may be too low to efficiently drive the turbocharger to provide compress intake air to the activated cylinders. As such, air may be delivered to the deactivated cylinders and compressed therein, where the compressed air from the deactivated cylinders may flow through the flow transfer ducts and to the activated cylinders.

FIG. 2 depicts an example of a cylinder of internal combustion engine 10 included by engine system 7 of vehicle 9. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 2 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. In one example, fuel injector 166 may be used with cylinders 2 and 3 of FIG. 1. While FIG. 2 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may be used with cylinders 1 and 4 of FIG. 1. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 2 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

In some examples, vehicle 9 may be a hybrid vehicle with multiple sources of torque available to one or more vehicle wheels 55. In other examples, vehicle 9 is a conventional vehicle with only an engine. In the example shown, vehicle 9 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 12 receives signals from the various sensors of FIG. 2 and employs the various actuators of FIG. 2 to adjust engine operation based on the received signals and instructions stored on a memory of the controller. For example, deactivation and/or activation of one or more cylinder groups may occur in response to a manifold vacuum and/or accelerator pedal position.

Turning now to FIG. 3, it shows a method 300 for activating and deactivating the first and second cylinder groups in response to engine operating parameters. Instructions for carrying out method 300 may be executed by a controller (e.g., controller 12) based on instructions stored on a memory of the controller and in conjunction with signals received from sensors of the engine system, such as the sensors described above with reference to FIG. 2. The controller may employ engine actuators of the engine system to adjust engine operation, according to the methods described below.

The method 300 begins at 302, which may include determining, estimating, and/or measuring one or more engine operating parameters. The engine operating parameters may include, but are not limited to, one or more of a throttle position, manifold vacuum, EGR flow rate, engine speed, engine temperature, engine load, and air/fuel ratio.

The method 300 proceeds to 304, which may include determining if the engine load is less than or equal to a first threshold. The first threshold may correspond to a lower engine load. More specifically, the first threshold may be substantially equal to a maximum output of a first cylinder group, such as first cylinder group of FIG. 1. Thus, operation of the first cylinder group and the second cylinder group to meet the first threshold may be inefficient or may provide too much power output.

If the engine load is less than or equal to the first threshold, then the method 300 proceeds to 306, which may include entering a first operating mode. The first operating mode may include activating the first cylinder group at 308. As described above with respect to FIG. 1, the first cylinder group may comprise the first cylinder 1 and the fourth cylinder 4. Additionally, the first operating mode may further include deactivating the second cylinder group at 310. Deactivating the second cylinder group may comprise blocking fuel injections, airflow, and/or spark in the cylinders of the second cylinder group. As such, only cylinders of the first cylinder group may be combusting during the first operating mode.

If the engine load is greater than the first threshold, then the method 300 proceeds to 312, which may include determining if the engine load is greater than a second threshold. The second threshold may correspond to a higher engine load. More specifically, the second threshold may be substantially equal to a maximum output of the cylinders of the second cylinder group. Thus, the second threshold is greater than the first threshold as the maximum output of the second cylinder group is larger than the maximum output of the first cylinder group due to the cylinders of the second cylinder group comprising a compression ratio larger than a compression ratio of the cylinders of the first cylinder group.

If the engine load is greater than the second threshold, then the method 300 proceeds to 314, which may include entering a second operating mode. The second operating mode may comprise activating the first and second cylinder groups at 316. As such, cylinders of each of the first and second cylinder groups may receive fuel. As described above, the first cylinder group may comprise a port and/or an intake passage fuel injection configuration while the second cylinder group may comprise a direct injection fuel injection configuration. In this way, the second threshold may correspond to an engine power output that is met when all the cylinders of the first and second cylinder groups are combusting.

The second operating mode may further comprise flowing EGR from the first cylinder group to the second cylinder group at 318. More specifically, a first flow transfer duct may be configured to flow at least some exhaust gas from the first cylinder to the second cylinder. A second flow transfer duct may be configured to flow at least some exhaust gas from the fourth cylinder to the third cylinder. As such, exhaust gas from the first cylinder may not flow to the third cylinder and exhaust gas from the fourth cylinder may not flow to the second cylinder. In this way, exhaust gas in the first flow transfer duct may not mix with exhaust gas in the second flow transfer duct.

In some examples, additionally or alternatively, the first and second flow transfer ducts may comprise valves or other similar devices for metering EGR flow from the first cylinder group to the second cylinder group. The valves may be adjusted to more open or more closed positions to increase or decrease EGR flow from the first cylinder group to the second cylinder group. A more open valve position may flow more EGR than a more closed valve position. In one example, a likelihood of knock may be estimated based on feedback from a sensor, wherein if the likelihood of knock is too high, then the valves of the flow transfer ducts may be moved to more open positions to flow more EGR from the first cylinder group to the second cylinder group to decrease the likelihood of knock.

Additionally or alternatively, the first and second flow transfer ducts may be free of valves. As such, to adjust EGR flow from the first cylinder group to the second cylinder group, fueling of the first cylinder group may be adjusted. For example, if less EGR is desired, the first cylinder group may receive less fuel to operate more lean. In response, the second cylinder group may ingest less air or receive more fuel to compensate for the air delivered from the first cylinder group to the second.

Returning to 312, if the engine load is not greater than the second threshold, then the method 300 proceeds to 320, where it is determined that the engine load is greater than the first threshold and less than or equal to the second threshold. As such, the method 300 proceeds to 322, which may include entering a third operating mode.

The third operating mode may comprise activating the second cylinder group at 324. Additionally, the third operating mode may comprise deactivating the first cylinder group at 326. As such, exhaust gas is not generated via the first cylinder group during the third operating mode. In this way, EGR may not flow from the first cylinder group to the second cylinder group during the third operating mode. In some examples, additionally or alternatively, the first cylinder group may be used to provide compressed air to the second cylinder group during the third operating mode. In this way, boost may be provided to the second cylinder group via a compressor and the first cylinder group during some operations of the third operating mode. Such an example may include where the compressor may not be able to meet a current boost demand and supplemental boost is desired.

It will be appreciated that the method 300 may include switching between the first, second, and third operating modes based on the engine load. For example, if the engine is in the first operating mode and the engine load increases such that the third operating mode is desired, then the second cylinder group may begin to receive fuel injections and the first cylinder group may be deactivated and no longer receive fuel injections. As another example, if the engine is in the first operating mode and the engine load increases such that the second operating mode is desired, then the second cylinder group may be activated and begin to receive fuel injections and the first cylinder group may be maintained activated.

Turning now to FIG. 4, it shows a graph 400 illustrating an engine operating sequence which depicts various engine operating parameters as a vehicle is operated. In one example, the engine operating sequence depicts the engine 10 of FIGS. 1 and 2 being executed in combination with the method 300 of FIG. 3. Plot 410 illustrates an engine load, dashed line 412 illustrates a first threshold and dashed line 414 illustrates a second threshold. As described above with respect to FIG. 3, the first threshold and second threshold may be based on power outputs of the first and second cylinder groups, respectively, wherein the second threshold is larger than the first threshold. Plot 420 illustrates an operating mode in which the engine is operating. Plot 430 illustrates an activation and a deactivation of the first cylinder group. Plot 440 illustrates an activation and a deactivation of the second cylinder group. Plot 450 illustrates EGR flow from the first cylinder group to the second cylinder group. It will be appreciated that in some examples, an engine may be equipped with an EGR system separate from the flow transfer ducts such that EGR may flow from the EGR system when EGR is not flowing through the flow transfer ducts. Time increases from a left to a right side of the figure.

Prior to t1, the engine load (plot 410) is below and increasing toward the first threshold (dashed line 412). As such, the engine is operating in the first operating mode (plot 420). During the first operating mode, the first cylinder group is activated (plot 430) and the second cylinder group is deactivated (plot 440). Since the second cylinder group is deactivated, EGR flow from the first cylinder group to the second cylinder group is relatively low (plot 450). In the example of FIG. 4, relatively low EGR flow is substantially zero.

At t1, the engine load increases above the first threshold, thereby indicating that a current load of the engine has exceeded an upper limit (e.g., a maximum output) of the first cylinder group. As such, the operating mode transitions from the first operating mode to the third operating mode. Transitioning from the first operating mode to the third operating mode may include deactivating the fuel injectors of the first cylinder group, which may be arranged in the intake passage and/or intake ports corresponding to the cylinders of the first cylinder group. In some examples, the transitioning may also include switching a fuel source from which fuel is injected. For example, due to the higher compression ratio of the second cylinder group, it may be desired to inject a fuel with a higher octane rating than fuel injected in the first cylinder group to mitigate premature combustion. In other examples, additionally or alternatively, the fuel system used as a fuel source for the first cylinder group may be the same as the fuel system used as a fuel source for the second cylinder group. Between t1 and t2, the engine load remains between the first threshold and the second threshold (dashed line 414). The operating mode remains in the third operating mode. EGR does not flow from the first cylinder group to the second cylinder group since exhaust gas is not produced in the first cylinder group while they are deactivated. However, in some examples, the first cylinder group may be used to compress intake air and supply the compressed intake air to the second cylinder group to supplement boost air flow.

At t2, the engine load increases above the second threshold and as such, the operating mode transitions from the third operating mode to the second operating mode. During the transition, the second cylinder group is maintained activated and the first cylinder group is activated such that the first and second cylinder groups are active concurrently. Between t2 and t3, the engine load remains above the second threshold and the first and second cylinder groups continue to receive fuel injections and remain active. EGR may flow from the first cylinder group to the second cylinder group to mitigate a likelihood of knock occurring in the second cylinder group due to its higher compression ratio.

At t3, the engine load begins to decrease. After t3, the engine load decreases to a load less than the first threshold. As such, the operating mode transitions from the second operating mode to the first operating mode. As a result, the second cylinder group is deactivated and no longer receive fuel injection while the first cylinder group is maintained active. As such, EGR flowing from the first cylinder group to second cylinder group decreases to substantially zero.

In this way, a variable displacement engine may comprise a first cylinder group having a first compression ratio and a second cylinder group comprising a second compression ratio. The first compression ratio may be less than the second so that the first cylinder group is configured to be more fuel efficient than the second cylinder group during lower engine loads. During mid-loads, the second cylinder group may be more efficient than the first. During higher engine loads, each of the first and second cylinder groups may be operated to meet a desired output while operating at a higher fuel economy than an engine with a single compression ratio. The technical effect of operating cylinder groups having different compression ratios is to increase fuel economy through a range of engine loads while decreasing a number of valves and other devices relied upon to adjust a displacement of an engine. Thus, manufacturing costs may decrease while fuel economy may increase.

An embodiment of an engine system comprises at least two cylinders divided into a first cylinder group and a second cylinder group, wherein the first cylinder group comprises a first compression ratio and the second cylinder group comprises a second compression ratio greater than the first compression ratio and a first fuel injector of the first cylinder group positioned to port inject and a second fuel injector of the second cylinder group positioned to direct inject. A first example of the engine system further comprises where the first compression ratio is greater than 9 and less than 11. A second example of the engine system, optionally including the first example, further comprises where the second compression ratio is greater than 11.5 and less than 14.5. A third example of the engine system, optionally including the first and/or second examples, further comprises at least four cylinders arranged in an inline configuration, wherein the first cylinder group comprises two outer cylinders and the second cylinder group comprises two inner cylinders. A fourth example of the engine system, optionally including one or more of the first through third examples, further includes where the two outer cylinders are fluidly coupled to the two inner cylinders via flow transfer ducts. A fifth example of the engine system, optionally including one or more of the first through fourth examples, further includes where a first outer cylinder of the two outer cylinders comprises a first flow transfer duct fluidly coupling it to a first inner cylinder of the two inner cylinders, wherein the first inner cylinder is directly adjacent to the first outer cylinder, and where a second outer cylinder of the two outer cylinders comprises a second flow transfer duct fluidly coupling it to a second inner cylinder of the two inner cylinders, wherein the second inner cylinder is directly adjacent to the second outer cylinder.

An embodiment of a method comprises selecting a first operating mode, a second operating mode, or a third operating mode in response to a comparison of an engine load to a first threshold and a second threshold, the second threshold being larger than the first, activating a first cylinder group comprising a first compression ratio during the first and second operating modes, and activating a second cylinder group comprising a second compression ratio during the second and third operating modes. A first example of the method further includes where the first operating mode is selected in response to the engine load being less than or equal to the first threshold, wherein the first operating mode comprises delivering fuel to at least one cylinder of the first cylinder group via a fuel injector arranged in an intake port or an intake passage corresponding to the at least one cylinder, and where the second cylinder group is deactivated during the first operating mode. A second example of the method, optionally including the first example, further includes where the third operating mode is selected in response to the engine load being greater than the first threshold and less than or equal to the second threshold, and where the third operating mode comprises delivering fuel to at least one cylinder of the second cylinder group via a fuel injector positioned to inject directly into the at least on cylinder, and where the first cylinder group is deactivated during the third operating mode. A third example of the method, optionally including the first and/or second examples, further includes where the second operating mode is selected in response to the engine load being greater than the second threshold, wherein the second operating mode comprises delivering fuel to cylinders of the first cylinder group and the second cylinder group. A fourth example of the method, optionally including one or more of the first through third examples, further includes where flowing exhaust gas from at least one cylinder of the first cylinder group directly to at least one cylinder of the second cylinder group, and where exhaust gas flows from the first cylinder group, through a flow transfer duct, and directly to the second cylinder group. A fifth example of the method, optionally including one or more of the first through fourth examples, further includes where the first threshold corresponds to a lower engine load and the second threshold corresponds to a higher engine load.

An additional embodiment of a system comprises an engine comprising a plurality of cylinders including a first cylinder, a second cylinder, a third cylinder, and a fourth cylinder, the first and fourth cylinders arranged outside of the second and third cylinders, further comprising a first cylinder group comprising the first and fourth cylinders and a second cylinder group comprising the second and third cylinders, where the first cylinder group comprises a first compression ratio and the second cylinder group comprises a second compression ratio greater than the first compression ratio, wherein the first cylinder group comprises fuel injectors positioned to inject into intake passage coupled to the first and fourth cylinders and where the second cylinder group comprises fuel injectors positioned to inject directly into the second and third cylinders, and a controller with computer-readable instructions stored on non-transitory memory thereof that when executed enable the controller to activate the first cylinder group and deactivate the second cylinder group in response to an engine load being less than or equal to a first threshold, activate the second cylinder group and deactivate the first cylinder group in response to the engine load being greater than the first threshold and less than or equal to a second threshold, and activate each of the first and second cylinder groups in response to the engine load being greater than the second threshold. A first example of the system further comprises where the first cylinder is directly adjacent to the second cylinder and fluidly coupled thereto via a first flow transfer duct, and where the fourth cylinder is directly adjacent to the third cylinder and fluidly coupled thereto via a second flow transfer duct. A second example of the system, optionally including the first example, further comprises where the first flow transfer duct directs exhaust gas from the first cylinder to the second cylinder and where the second flow transfer duct directs exhaust gas from the fourth cylinder to the third cylinder, and where exhaust gas in the first flow transfer duct does not mix with exhaust gas in the second flow transfer duct. A third example of the system, optionally including the first and/or second examples, further includes where the controller comprises instructions that enable the controller to block fuel from being injected to the second cylinder group in response to the engine load being less than or equal to the first threshold. A fourth example of the system, optionally including one or more of the first through third examples, further includes where the controller comprises instructions that enable the controller to block fuel from being injected to the first cylinder group in response to the engine load being greater than the first threshold and less than or equal to the second threshold. A fifth example of the system, optionally including one or more of the first through fourth examples, further includes where the first compression ratio is between 9 and 11 and the second compression ratio is between 11.5 and 14. A sixth example of the system, optionally including one or more of the first through fifth examples, further includes where the first cylinder group flows compressed gas to the second cylinder group. A seventh example of the system, optionally including one or more of the first through sixth examples, further includes where the intake passage coupled to the first and fourth cylinders is not coupled to the second and third cylinders.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily desired to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method comprising:
selecting a first operating mode, a second operating mode, or a third operating mode in response to a comparison of an engine load to a first threshold and a second threshold, the second threshold being larger than the first threshold;
activating only a first cylinder group comprising a first compression ratio during the first operating mode;

activating both the first cylinder group comprising the first compression ratio and a second cylinder group comprising a second compression ratio during the second operating mode, the second operating mode further comprising flowing exhaust gas from at least one cylinder of the first cylinder group to at least one cylinder of the second cylinder group, such that the exhaust gas flows from the first cylinder group, through a flow transfer duct, and directly to the second cylinder group; and activating only the second cylinder group comprising the second compression ratio during the third operating mode.

2. The method of claim 1, wherein the first operating mode is selected in response to the engine load being less than or equal to the first threshold, wherein the first operating mode comprises delivering fuel to the at least one cylinder of the first cylinder group via a fuel injector arranged in an intake port or an intake passage corresponding to the at least one cylinder of the first cylinder group, and where the second cylinder group is deactivated during the first operating mode.

3. The method of claim 1, wherein the third operating mode is selected in response to the engine load being greater than the first threshold and less than or equal to the second threshold, and where the third operating mode comprises delivering fuel to the at least one cylinder of the second cylinder group via a fuel injector positioned to inject fuel directly into the at least one cylinder of the second cylinder group, and where the first cylinder group is deactivated during the third operating mode.

4. The method of claim 1, wherein the second operating mode is selected in response to the engine load being greater than the second threshold, wherein the second operating mode comprises delivering fuel to cylinders of the first cylinder group and the second cylinder group.

5. The method of claim 1, wherein the first threshold corresponds to a lower engine load and the second threshold corresponds to a higher engine load.

6. A system comprising:
an engine comprising a plurality of cylinders including a first cylinder, a second cylinder, a third cylinder, and a fourth cylinder, the first and fourth cylinders respectively arranged outside of the second and third cylinders, the plurality of cylinders further comprising a first cylinder group comprising the first and fourth cylinders and a second cylinder group comprising the second and third cylinders, where the first cylinder group comprises a first compression ratio and the second cylinder group comprises a second compression ratio greater than the first compression ratio; wherein
the first cylinder group comprises fuel injectors positioned to inject fuel into an intake passage coupled to the first and fourth cylinders, and the second cylinder group comprises fuel injectors positioned to inject fuel directly into the second and third cylinders; and
a controller with computer-readable instructions stored on non-transitory memory that when executed enable the controller to:
activate only the first cylinder group and deactivate all cylinders of the second cylinder group in response to an engine load being less than or equal to a first threshold during a first mode;
activate each of the first and second cylinder groups in response to the engine load being greater than a second threshold during a second mode, wherein the second mode further comprises flowing compressed gas from the first cylinder group, through flow transfer ducts, and to the second cylinder group; and
activate only the second cylinder group and deactivate all cylinders of the first cylinder group in response to the engine load being greater than the first threshold and less than or equal to the second threshold during a third mode.

7. The system of claim 6, wherein the first cylinder is directly adjacent to the second cylinder and fluidly coupled thereto via a first flow transfer duct, and where the fourth cylinder is directly adjacent to the third cylinder and fluidly coupled thereto via a second flow transfer duct.

8. The system of claim 7, wherein the first flow transfer duct directs exhaust gas from the first cylinder to the second cylinder and where the second flow transfer duct directs exhaust gas from the fourth cylinder to the third cylinder, and where exhaust gas in the first flow transfer duct does not mix with exhaust gas in the second flow transfer duct.

9. The system of claim 6, wherein the controller comprises instructions that enable the controller to stop fuel from being injected into the second cylinder group in response to the engine load being less than or equal to the first threshold.

10. The system of claim 6, wherein the controller comprises instructions that enable the controller to stop fuel from being injected into the first cylinder group in response to the engine load being greater than the first threshold and less than or equal to the second threshold.

11. The system of claim 6, wherein the first compression ratio is between 9 and 11 and the second compression ratio is between 11.5 and 14.

* * * * *